United States Patent
Hwang et al.

(10) Patent No.: US 9,803,800 B2
(45) Date of Patent: Oct. 31, 2017

(54) DISPLACEMENT MECHANISM

(71) Applicant: NATIONAL TAIPEI UNIVERSITY of TECHNOLOGY, Taipei (TW)

(72) Inventors: Hsiu-Ying Hwang, Taipei (TW); Hang-Kuang Hsu, Taipei (TW); Chien-Te Lee, Taipei (TW); Yu-Chih Chu, Taipei (TW)

(73) Assignee: NATIONAL TAIPEI UNIVERSITY of TECHNOLOGY, Taipei (TW)

( * ) Notice: Subject to any disclaimer, the term of this patent is extended or adjusted under 35 U.S.C. 154(b) by 0 days.

(21) Appl. No.: 15/367,165

(22) Filed: Dec. 1, 2016

(65) Prior Publication Data
US 2017/0167659 A1    Jun. 15, 2017

(30) Foreign Application Priority Data
Dec. 15, 2015   (TW) .............................. 104142120 A

(51) Int. Cl.
| | |
|---|---|
| *B25J 17/00* | (2006.01) |
| *B25J 18/00* | (2006.01) |
| *F16M 11/08* | (2006.01) |
| *F16M 11/04* | (2006.01) |
| *B23C 1/12* | (2006.01) |
| *F16M 13/02* | (2006.01) |

(Continued)

(52) U.S. Cl.
CPC .......... *F16M 13/022* (2013.01); *B33Y 30/00* (2014.12); *B25J 9/0051* (2013.01); *B25J 17/0266* (2013.01); *F16M 2200/063* (2013.01)

(58) Field of Classification Search
CPC .... B25J 9/0009; B25J 9/1065; B25J 17/0266; F16M 13/022; F16M 2200/063; B33Y 30/00

USPC ......... 248/125.1, 145, 179.1, 591, 593, 669; 74/490.01, 490.02, 490.05, 490.07
See application file for complete search history.

(56) References Cited

U.S. PATENT DOCUMENTS

| | | | | |
|---|---|---|---|---|
| 4,976,582 A | * | 12/1990 | Clavel .................... | B25J 9/1065 248/179.1 |
| 6,575,676 B2 | * | 6/2003 | Wang .................. | B23Q 1/5462 74/479.01 |

(Continued)

FOREIGN PATENT DOCUMENTS

| | | |
|---|---|---|
| CN | 104608389 A | 5/2015 |
| CN | 204471889 U | 7/2015 |

(Continued)

*Primary Examiner* — Tan Le
(74) *Attorney, Agent, or Firm* — CKC & Partners Co., Ltd.

(57) ABSTRACT

A displacement mechanism includes a base, three rails, three arm assemblies, a moving platform, and three parallel linkage assemblies. The rails stand on the base. Each of the arm assemblies has a first end and a second end. The first ends are slidably connected to the rails, respectively. Each of the arm assemblies is configured to swing in a space among the rails. The moving platform is parallel to the base. Two ends of each of the parallel linkage assemblies are connected to the second end of the corresponding arm assembly and the moving platform in a multidirectional rotating way, respectively. Each of the arm assemblies substantially extends away from the base from the corresponding rail, and each of the parallel linkage assemblies substantially extends toward the base from the second end of the corresponding arm assembly.

11 Claims, 6 Drawing Sheets

(51) Int. Cl.
*B33Y 30/00* (2015.01)
*B25J 9/00* (2006.01)
*B25J 17/02* (2006.01)

(56) References Cited

U.S. PATENT DOCUMENTS

| | | |
|---|---|---|
| 8,904,899 B2 | 12/2014 | Bunsendal et al. |
| 8,967,015 B2* | 3/2015 | Monti ................ B25J 17/0266 74/490.01 |
| 2004/0086351 A1* | 5/2004 | Kim ........................ B23Q 1/34 74/490.07 |
| 2005/0129495 A1* | 6/2005 | Brogardh ............ B25J 17/0266 414/680 |
| 2011/0048159 A1* | 3/2011 | Pierrot ................ B25J 17/0266 74/490.05 |
| 2012/0227532 A1* | 9/2012 | Huang .................. B25J 9/0051 74/490.05 |
| 2014/0311271 A1 | 10/2014 | Cao et al. |
| 2015/0176754 A1* | 6/2015 | Houston ............... B25J 9/0009 248/125.2 |

FOREIGN PATENT DOCUMENTS

| | | |
|---|---|---|
| CN | 204687359 U | 10/2015 |
| TW | 201335516 A | 9/2013 |
| TW | M501948 U | 6/2015 |
| TW | M509118 U | 9/2015 |

\* cited by examiner

DISPLACEMENT MECHANISM

RELATED APPLICATIONS

This application claims priority to Taiwan Application Serial Number 104142120, filed Dec. 15, 2015, which is herein incorporated by reference.

BACKGROUND

Technical Field

The present disclosure relates to a displacement mechanism, and more particularly, to a delta displacement mechanism.

Description of Related Art

FIG. 1 is a perspective view of a conventional 3D printer 200. As shown in FIG. 1, the 3D printer 200 mainly includes a base 210, a platform 220, three rails 230, three sliders 240, three parallel linkage assemblies 250, and a nozzle 260. The platform 220 is placed on the base 210. The sliders 240 are respectively slidably disposed on the rails 230. Each of the parallel linkage assemblies 250 includes two linkages, and each of the linkages respectively rotatably connected the corresponding slider 240 and the nozzle 260. Hence, by driving the sliders 240 to respectively move on the rails 230, the nozzle 260 can be moved by the parallel linkage assemblies 250, so as to print a 3D object on the platform 220.

However, in order to obtain a certain printable working range in horizontal directions, the parallel linkage assemblies 250 of the conventional 3D printer 200 must have an enough length, which makes the 3D printer 200 to sacrifice its certain printable working range in the vertical direction. That is, even though all sliders 240 shown in FIG. 1 slide to the top of the rails 230, the parallel linkage assemblies 250 cannot move the nozzle 260 to reach a height close to the top of the 3D printer 200. Furthermore, the mechanism design of the 3D printer 200 cannot ensure the nozzle 260 to be horizontal while laterally moving. Other related arts can also be referred to China Patent Number CN104608389A and China Patent Number CN204471889U.

SUMMARY

An aspect of the disclosure is to provide a displacement mechanism to solve the above-mentioned problems.

According to an embodiment of the disclosure, a displacement mechanism includes a base, three rails, three arm assemblies, a moving platform, and three parallel linkage assemblies. The rails stand on the base. Each of the arm assemblies has a first end and a second end. The first ends of the arm assemblies are respectively slidably connected to the rails. Each of the arm assemblies is configured to swing in a space among the rails. The moving platform is parallel to the base. Two ends of each of the parallel linkage assemblies are respectively connected to the second end of the corresponding one of the arm assemblies and the moving platform in a multidirectional rotating way. Each of the arm assemblies substantially extends away from the base from the corresponding one of the rails. Each of the parallel linkage assemblies substantially extends toward the base from the second end of the corresponding one of the arm assemblies.

In an embodiment of the disclosure, the displacement mechanism further includes a top board. The top board is connected to ends of the rails opposite to the base. The top board has an opening allowing the arm assemblies and the parallel linkage assemblies to partially pass through.

In an embodiment of the disclosure, any two of the rails define the same distance.

In an embodiment of the disclosure, the top board is in the shape of a regular hexagon. The rails are respectively connected to three nonadjacent vertices of the top board.

In an embodiment of the disclosure, each of the arm assemblies includes a slider and a first linkage. The slider is slidably connected to the corresponding one of the rails. One end of the first linkage is pivotally connected to the slider. The first linkage substantially extends away from the base from the slider.

In an embodiment of the disclosure, the arm assemblies are configured to respectively swing in three planes of rotation in the space among the rails. The planes of rotation are parallel to the rails. Any two of the planes of rotation define the same included angle.

In an embodiment of the disclosure, each of the first linkages has a rotation axis perpendicular to the rails.

In an embodiment of the disclosure, each of the parallel linkage assemblies includes two second linkages. Two ends of each of the second linkages are respectively connected to the second end of the corresponding one of the arm assemblies and the moving platform in a multidirectional rotating way. The second linkages are parallel to each other.

In an embodiment of the disclosure, the ends of each of the second linkages are respectively connected to the corresponding one of the arm assemblies and the moving platform in the form of ball joints.

In an embodiment of the disclosure, the displacement mechanism further includes a connecting structure. The connecting structure is connected to the second ends of the arm assemblies in a multidirectional rotating way. Any two of the second ends of the arm assemblies define the same distance.

In an embodiment of the disclosure, the connecting structure is connected to the arm assemblies in the form of ball joints.

In an embodiment of the disclosure, the connecting structure is in the shape of a regular hexagon. The second ends of the arm assemblies are respectively connected to three nonadjacent vertices of the connecting structure.

Accordingly, in the displacement mechanism of the present disclosure, the sliding ends of the arm assemblies are respectively slidably connected to the rails, and ends of the parallel linkage assemblies at a side are respectively connected to the swing ends of the arm assemblies in a multi-directional rotating way, so the movable height of the moving platform connected to ends of the parallel linkage assemblies at another side relative to the base is related to the height of the swing ends of the arm assemblies, rather than is limited by the height of the rails. Therefore, by moving the swing ends of the arm assemblies to exceed the height of the rails, the moving platform can be moved to close to the top board of the displacement mechanism, which greatly increases the movable working range of the moving platform in the vertical direction. Furthermore, because the moving platform is connected to any of the rails through an arm assembly and a pair of parallel linkage assemblies, when the moving platform of the present disclosure moves in the horizontal directions, the moving distances of the sliding ends of the arm assemblies on the rails are short. As a result, the moving platform of the present disclosure can move to a predetermined position more quickly. In addition, the displacement mechanism of the present disclosure connects the connecting structure to the swing ends of the arm assemblies in a multidirectional rotating way, so as to achieve the purpose of keeping the moving platform to be horizontal while laterally moving.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
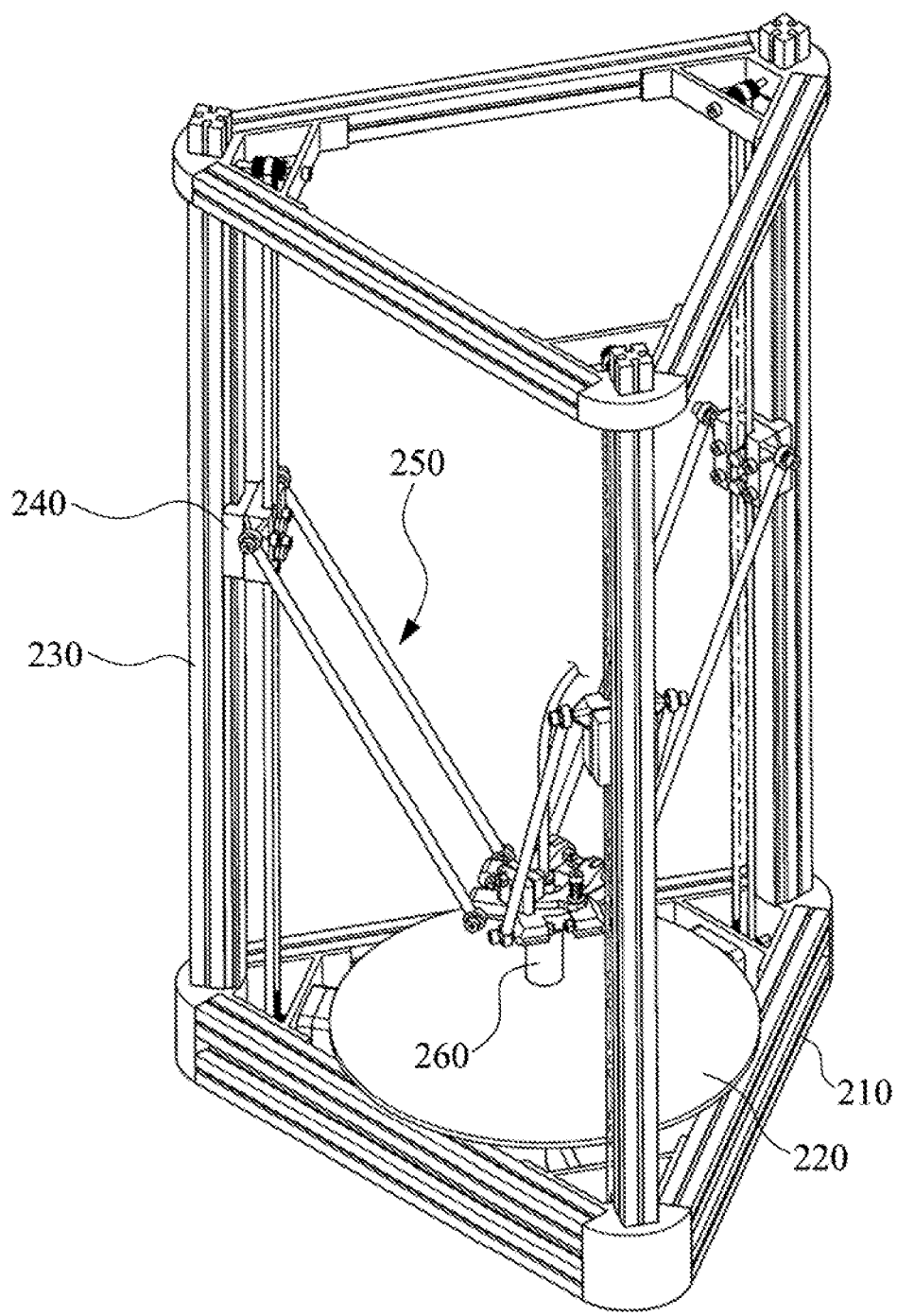
FIG. 1 is a perspective view of a conventional 3D printer.

Reference will now be made in detail to the present embodiments of the disclosure, examples of which are illustrated in the accompanying drawings. Wherever possible, the same reference numbers are used in the drawings and the description to refer to the same or like parts.

Figure 2:
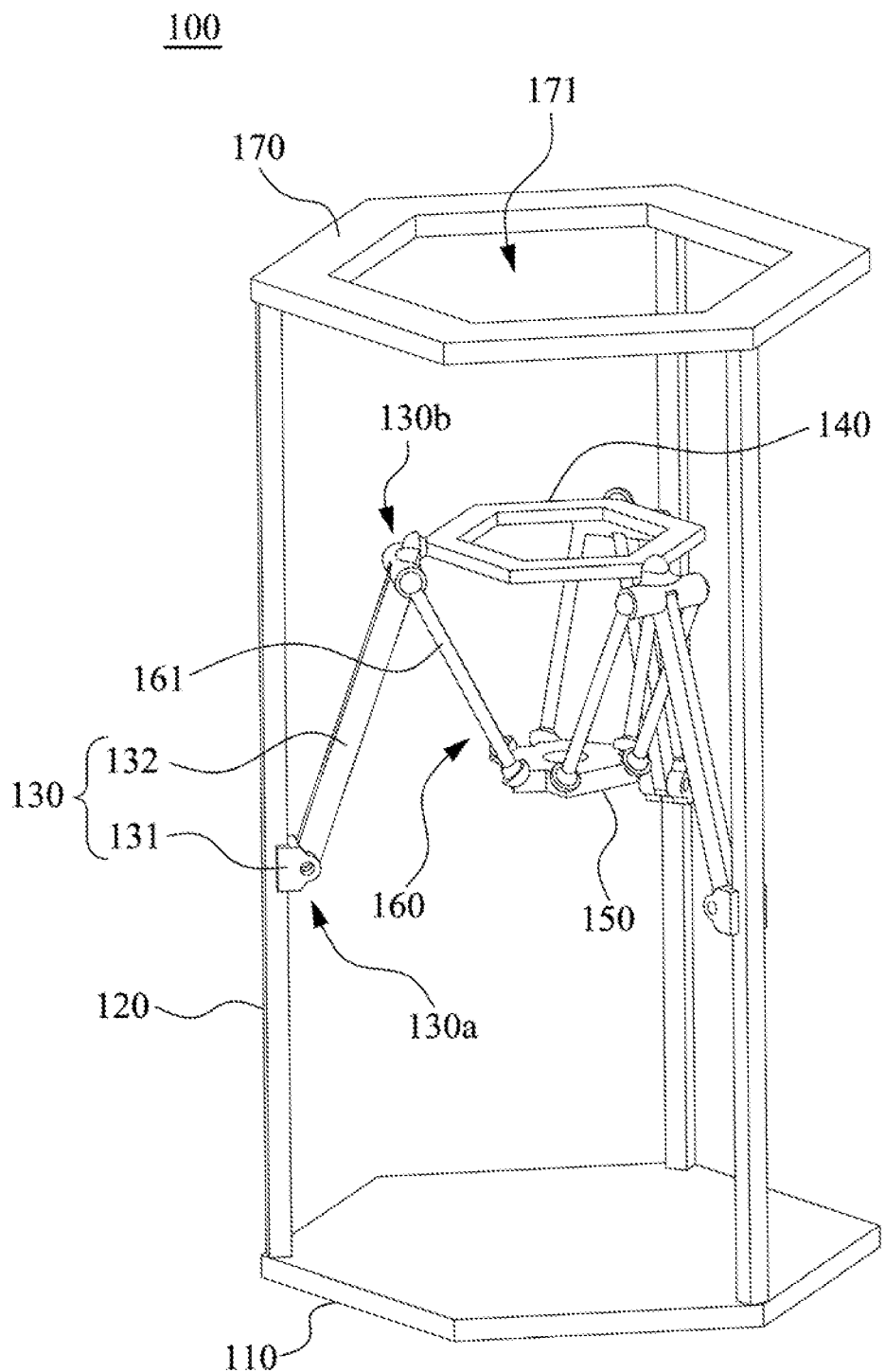
FIG. 2 is a perspective view of a displacement mechanism according to some embodiments of the disclosure.

Reference is made to FIG. 2. FIG. 2 is a perspective view of a displacement mechanism 100 according to some embodiments of the disclosure. As shown in FIG. 2, in some embodiments, the displacement mechanism 100 includes a base 110, three rails 120, three arm assemblies 130, a moving platform 150, three parallel linkage assemblies 160, and a top board 170. The displacement mechanism 100 of the embodiments can be applied in fields of 3D printers, robot mechanisms, electric vehicle carriers, a high-speed displacement mechanisms, and etc. The structures and functions of the foregoing components and the connection relationships among the foregoing components are introduced in detail below.

As shown in FIG. 2, in the embodiments, the rails 120 of the displacement mechanism 100 stand on the base 110. Each of the arm assemblies 130 has a first end 130a and a second end 130b. The first ends 130a of the arm assemblies 130 are respectively slidably connected to the rails 120. Each of the arm assemblies 130 is configured to swing in a space among the rails 120. Specifically, each of the arm assemblies 130 includes a slider 131 and a first linkage 132. The slider 131 is slidably connected to the corresponding one of the rails 120. One end of the first linkage 132 is pivotally connected to the slider 131, so as to rotate relative to the slider 131. The first linkage 132 substantially extends away from the base 110 from the slider 131. The pivotal end of the first linkage 132 relative to the slider 131 can be regarded as the first end 130a of the arm assembly 130, and the end of the first linkage 132 away from the slider 131 can be regarded as the second end 130b of the arm assembly 130.

The moving platform 150 of the displacement mechanism 100 is parallel to the base 110. Two ends of each of the parallel linkage assemblies 160 of the displacement mechanism 100 are respectively connected to the second end 130b of the corresponding one of the arm assemblies 130 and the moving platform 150 in a multidirectional rotating way. The top board 170 of the displacement mechanism 100 is connected to ends of the rails 120 opposite to the base 110. That is, each of the rails 120 is connected between the base 110 and the top board 170. A shown in FIG. 2, the top board 170 has an opening 171. The opening 171 allows the arm assemblies 130 and the parallel linkage assemblies 160 to partially pass through.

Figure 3A:
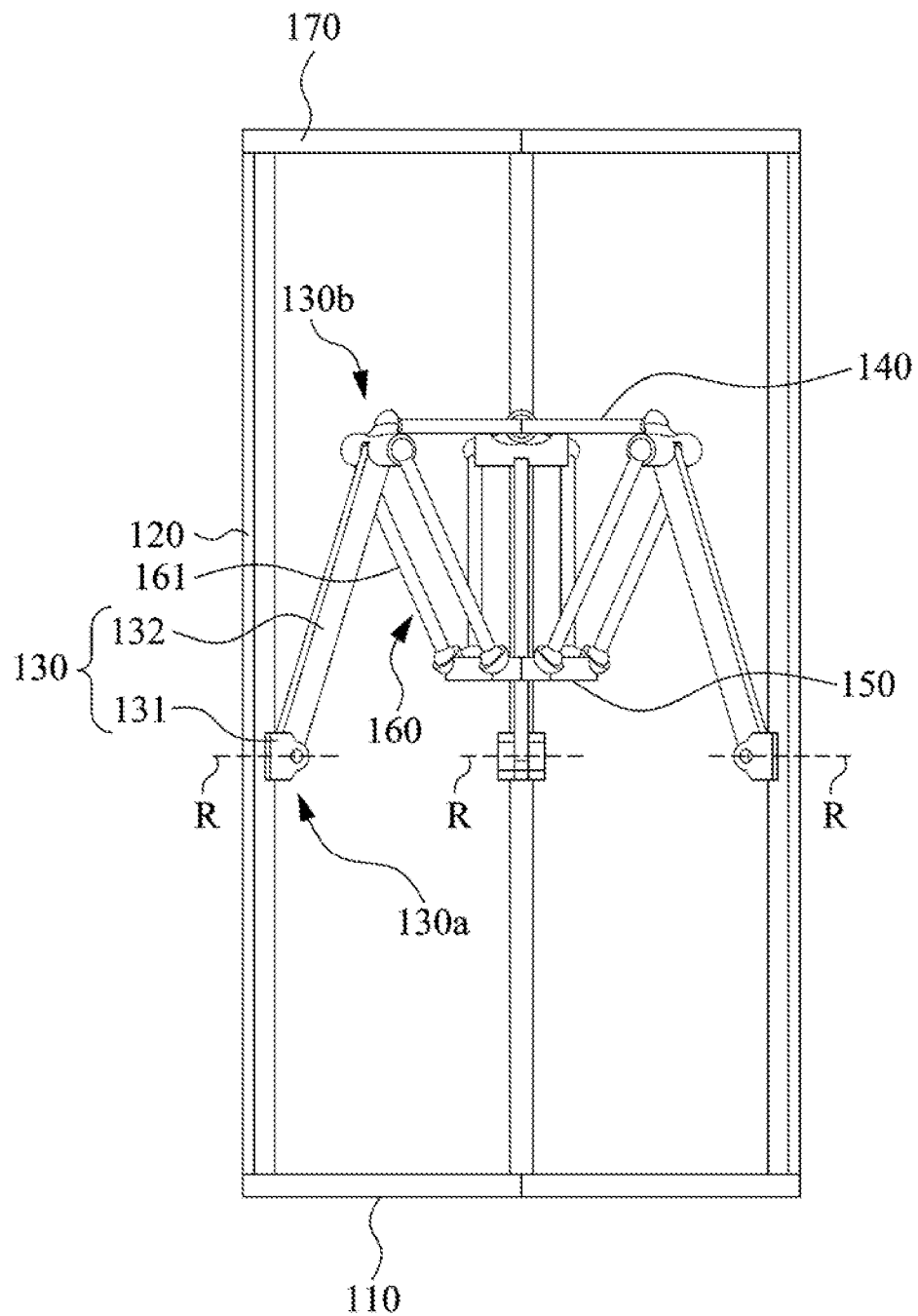
FIGS. 3A and 3B are side views of the displacement mechanism according to some embodiments of the disclosure, in which the moving platform of the displacement mechanism moves in the vertical direction.
Figure 3B:
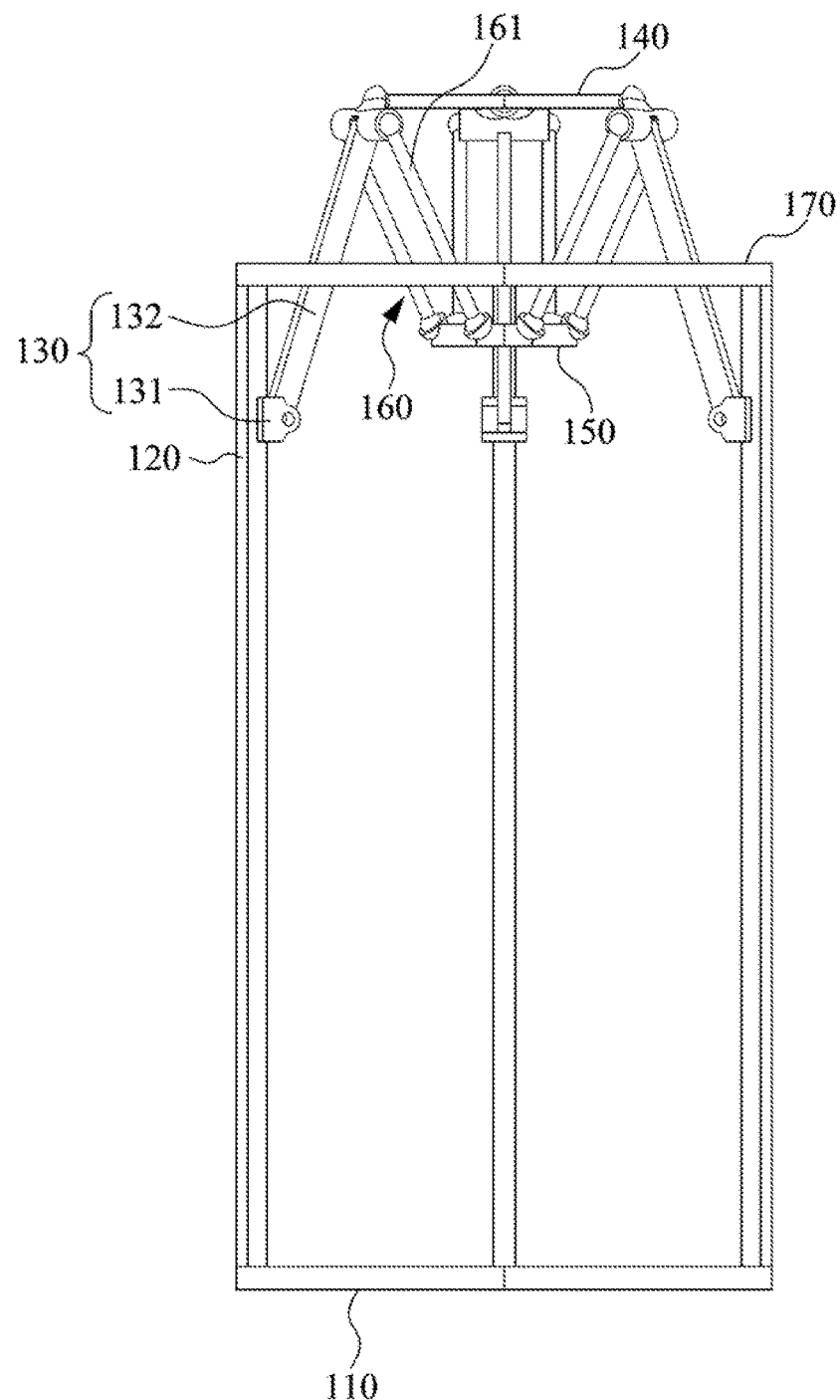

Reference is made to FIGS. 3A and 3B. FIGS. 3A and 3B are side views of the displacement mechanism 100 according to some embodiments of the disclosure, in which the moving platform 150 of the displacement mechanism 100 moves in the vertical direction. As shown in FIGS. 3A and 3B with reference to FIG. 2, each of the arm assemblies 130 of the displacement mechanism 100 substantially extends away from the base 110 from the corresponding one of the rails 120, and each of the parallel linkage assemblies 160 substantially extends toward the base 110 from the second end 130b of the corresponding one of the arm assemblies 130. Hence, during a period of movement of the moving platform 150, the arm assemblies 130 and the parallel linkage assemblies 160 will not protrude to the space right under the moving platform 150. In addition, under the structural configuration, when the sliders 131 of the arm assemblies 130 slide toward the top board 170 (e.g., the sliders 131 move from the positions shown in FIG. 3A to the positions shown in FIG. 3B), the arm assemblies 130 and the parallel linkage assemblies 160 can partially pass through the opening 171 of the top board 170.

Therefore, the movable height of the moving platform 150 connected to ends of the parallel linkage assemblies 160 at another side relative to the base 110 is related to the height of the swing ends (i.e., the second ends 130b) of the arm assemblies 130, rather than is limited by the height of the rails 120. As a result, by moving the second ends 130b of the arm assemblies 130 to pass through the opening 171 of the top board 170 and exceed the height of the rails 120, the moving platform 150 can be moved to close to the top board 170, which greatly increases the movable working range of the moving platform 150 in the vertical direction.

Figure 4:
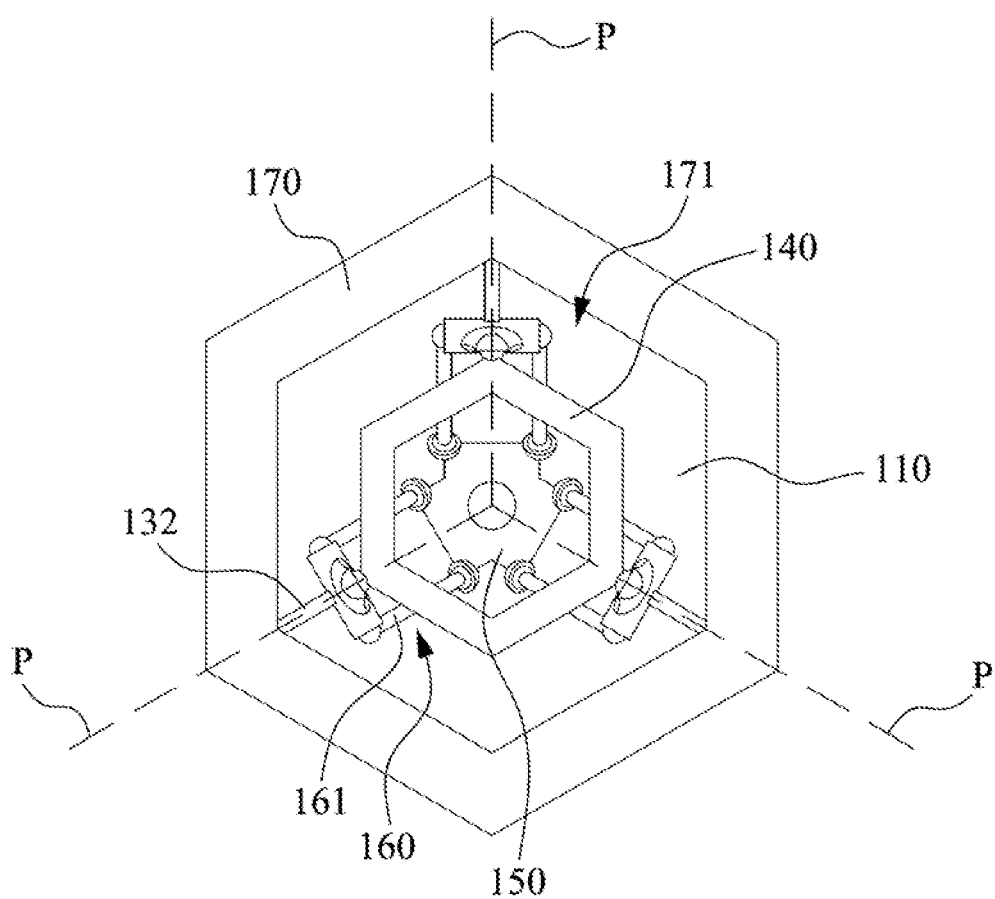
FIG. 4 is a top view of the displacement mechanism shown in FIG. 2.

Reference is made to FIG. 4. FIG. 4 is a top view of the displacement mechanism 100 shown in FIG. 2. As shown in FIGS. 2 and 4, in the embodiments, any two of the rails 120 of the displacement mechanism 100 define the same distance (i.e., the rails 120 are parallel to each other). The arm assemblies 130 are configured to respectively swing in three planes of rotation P in the space among the rails 120. The planes of rotation P are parallel to the rails 120, and any two of the planes of rotation P define the same included angle (i.e., the included angle is 120 degrees). Specifically, in order to make the arm assemblies 130 respectively swing in three planes of rotation P parallel to the rails 120, the rotation axis of the first linkages 132 of each of the arm assemblies 130 can be configured to be perpendicular to the corresponding one of the rails 120 (referring to FIG. 3A). Each of the parallel linkage assemblies 160 includes two second linkages 161. Two ends of each of the second linkages 161 are respectively connected to the second end 130b of the corresponding one of the arm assemblies 130 and the moving platform 150 in a multidirectional rotating way, and the second linkages 161 are parallel to each other. In addition, the displacement mechanism 100 further includes a connecting structure 140. The connecting structure 140 is connected to the second ends 130b of the arm assemblies 130 in a multidirectional rotating way. Any two of the second ends 130b of the arm assemblies 130 define the same distance (see FIG. 4).

In some embodiments, the top board 170 of the displacement mechanism 100 is in the shape of a regular hexagon. The rails 120 are respectively connected to three nonadjacent vertices of the top board 170. Hence, distances among the rails 120 can be ensured to be the same. However, the shape of the top board 170 is not limited in this regard. In practical applications, the top board 170 of the displacement mechanism 100 can be triangular, circular, or ring-shaped.

In some embodiments, the connecting structure 140 of the displacement mechanism 100 is in the shape of a regular hexagon. The second ends 130b of the arm assemblies 130 are respectively connected to three nonadjacent vertices of the connecting structure 140. Hence, distances among the second ends 130b of the arm assemblies 130 can be ensured to be the same. However, the shape of the connecting structure 140 is not limited in this regard. In practical applications, the connecting structure 140 of the displacement mechanism 100 can also be triangular, circular, or ring-shaped.

In some embodiments, the connecting structure 140 of the displacement mechanism 100 is hollow in the center, so as to make the displacement mechanism 100 lightweight.

Figure 5A:
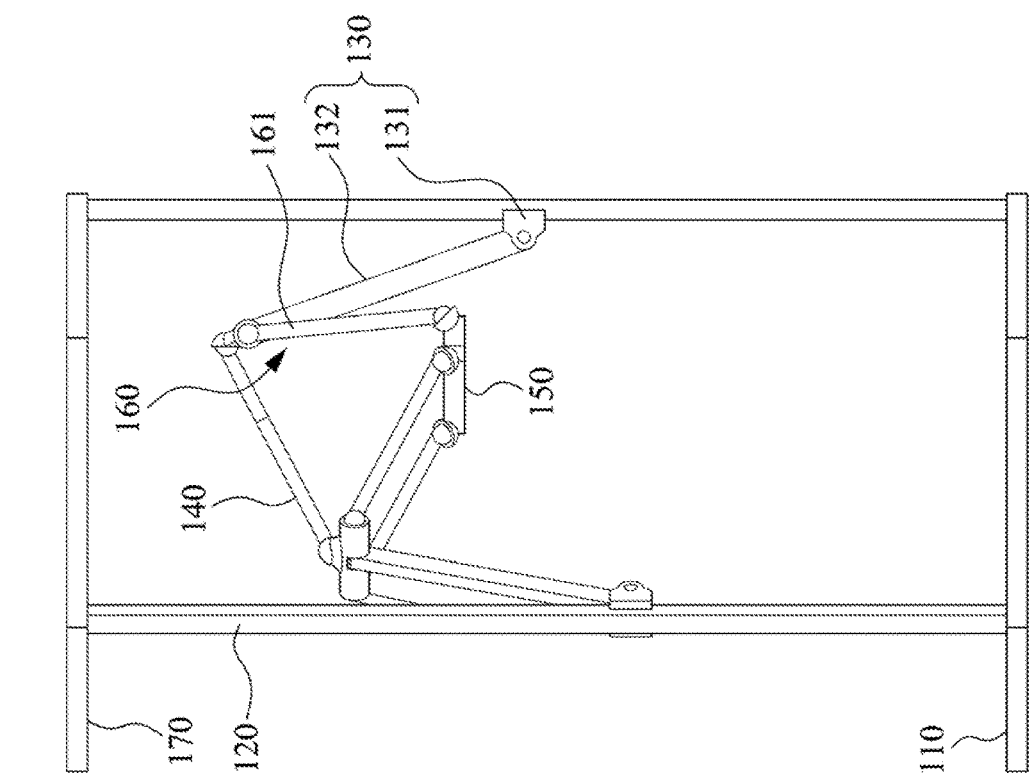
FIGS. 5A and 5B are side views of the displacement mechanism according to some embodiments of the disclosure, in which one of the arm assemblies slides relative to the corresponding rail to make the moving platform move in a horizontal direction.
Figure 5B:
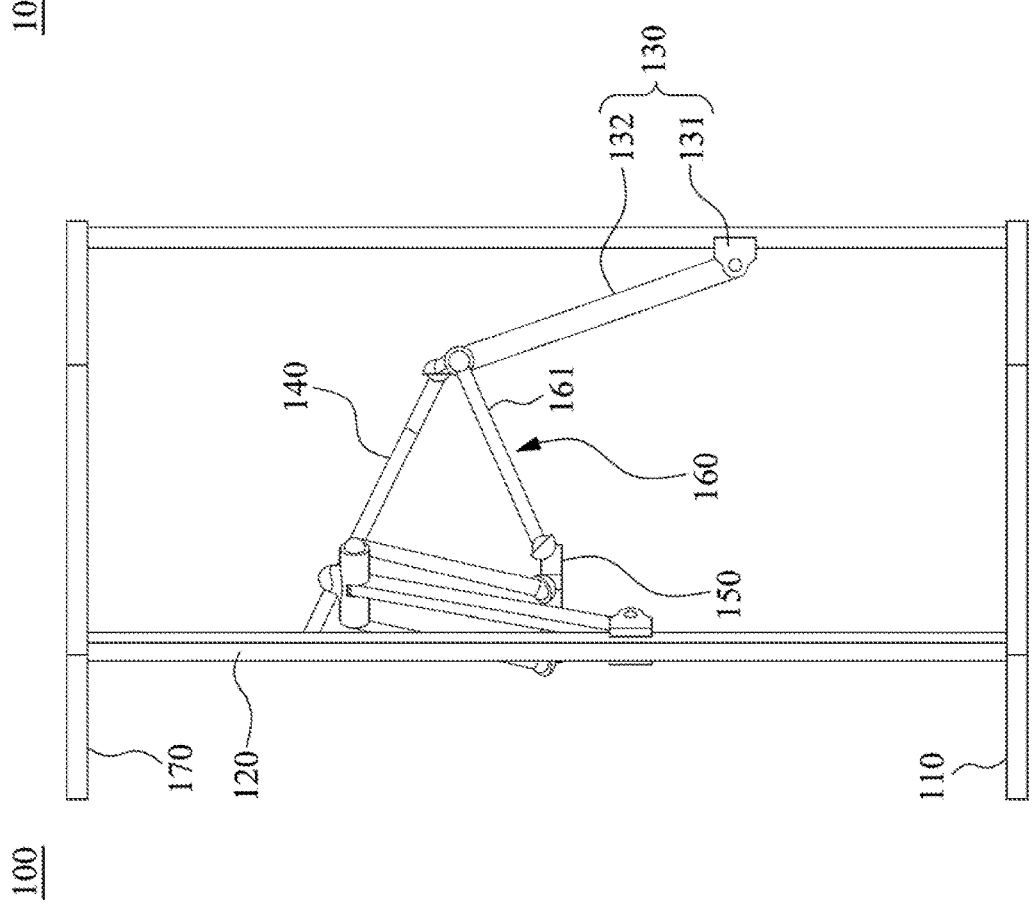

FIGS. 5A and 5B are side views of the displacement mechanism 100 according to some embodiments of the disclosure, in which one of the arm assemblies 130 slides relative to the corresponding rail 120 to make the moving platform 150 move in a horizontal direction. With the structural configurations (i.e., the parallel second linkages 161 of each of the parallel linkage assemblies 160 are connected to the corresponding one of the arm assemblies 130 and the moving platform 150 in a multidirectional rotating way, the connecting structure 140 is connected to the second ends 130b of the arm assemblies 130 in a multidirectional rotating way, and the distances among the second ends 130b are the same), the displacement mechanism 100 can achieve the purpose of keeping the moving platform 150 to be horizontal while laterally moving. It should be pointed out that to effectively maintain the horizontal movement of the moving platform 150, each of the parallel linkage assemblies 160 at least includes two second linkages 161.

In some embodiments, two ends of each of the second linkages 161 are respectively connected to the corresponding one of the arm assemblies 130 and the moving platform 150 in the form of ball joints, and the connecting structure 140 is connected to the arm assemblies 130 in the form of ball joints, but the disclosure is not limited in this regard. In practical applications, structures that can connect two objects in a multidirectional rotating way can also be applied in the embodiments of the present disclosure.

Moreover, because the moving platform 150 is connected to any one of the rails 120 through the corresponding one of the arm assemblies 130 and the corresponding one of the parallel linkage assemblies 160, the vertical distances that the sliding ends (i.e., the first ends 130a) of the arm assemblies 130 move on the rails 120 is shorter than the vertical distances that the sliders 240 of the conventional 3D printer 200 move on the rails 230 (or even halved) when the nozzle 260 of the conventional 3D printer 200 and the moving platform 250 of the present disclosure move with the same distance in horizontal directions. Relatively speaking, when the sliding ends of the arm assemblies 130 of the present disclosure and the sliders 240 of the conventional 3D printer 200 move with the same velocity, the moving platform 150 of the present disclosure can move to the predetermined location more quickly.

Therefore, the displacement mechanism 100 of the present disclosure has stable and high-speed operating performances and high accuracies and is suitable for operations of precision handling, assembling, arranging and packaging.

In some embodiments, the displacement mechanism 100 can further include a driving module and transmission modules (not shown). The driving module can be disposed on the base 110. The transmission modules can be respectively disposed on the rails 120 and configured to respectively move the sliders 131 of the arm assemblies 130 along the rails 120. For example, the driving module can be a motor, but the disclosure is not limited in this regard. For example, the transmission modules can be belts, screws, racks, and etc., but the disclosure is not limited in this regard.

In some embodiments, the first linkages 132 of the arm assemblies 130 and the second linkages 161 of the parallel linkage assemblies 160 can be manufactured by light materials, so as to allow acceleration and deceleration with a very high speed due to the reduction of inertia. Furthermore, the displacement mechanism 100 is constituted by three arm assemblies 130 and three parallel linkage assemblies 160, so the overall rigidity of the displacement mechanism 100 still has a certain level.

According to the foregoing recitations of the embodiments of the disclosure, it can be seen that in the displacement mechanism of the present disclosure, the sliding ends of the arm assemblies are respectively slidably connected to the rails, and ends of the parallel linkage assemblies at a side are respectively connected to the swing ends of the arm assemblies in a multidirectional rotating way, so the movable height of the moving platform connected to ends of the parallel linkage assemblies at another side relative to the base is related to the height of the swing ends of the arm assemblies, rather than is limited by the height of the rails. Therefore, by moving the swing ends of the arm assemblies to exceed the height of the rails, the moving platform can be moved to close to the top board of the displacement mechanism, which greatly increases the movable working range of the moving platform in the vertical direction. Furthermore, because the moving platform is connected to any of the rails through an arm assembly and a pair of parallel linkage assemblies, when the moving platform of the present disclosure moves in the horizontal directions, the moving distances of the sliding ends of the arm assemblies on the rails are short. As a result, the moving platform of the present disclosure can move to a predetermined position more quickly. In addition, the displacement mechanism of the present disclosure connects the connecting structure to the swing ends of the arm assemblies in a multidirectional rotating way, so as to achieve the purpose of keeping the moving platform to be horizontal while laterally moving.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A displacement mechanism, comprising:
   a base;
   three rails standing on the base;
   three arm assemblies each having a first end and a second end, wherein the first ends of the arm assemblies are respectively slidably connected to the rails, and each of the arm assemblies is configured to swing in a space among the rails;
   a moving platform parallel to the base;
   three parallel linkage assemblies, two ends of each of the parallel linkage assemblies being respectively connected to the second end of the corresponding one of the arm assemblies and the moving platform in a multidirectional rotating way; and
   a connecting structure connected to the second ends of the arm assemblies in a multidirectional rotating way, wherein any two of the second ends of the arm assemblies define the same distance,
   wherein each of the arm assemblies substantially extends away from the base from the corresponding one of the rails, and each of the parallel linkage assemblies substantially extends toward the base from the second end of the corresponding one of the arm assemblies.

2. The displacement mechanism of claim 1, further comprising a top board connected to ends of the rails opposite to the base, wherein the top board has an opening allowing the arm assemblies and the parallel linkage assemblies to partially pass through.

3. The displacement mechanism of claim 2, wherein any two of the rails define the same distance.

4. The displacement mechanism of claim 3, wherein the top board is in the shape of a regular hexagon, and the rails are respectively connected to three nonadjacent vertices of the top board.

5. The displacement mechanism of claim 1, wherein each of the arm assemblies comprises:
   a slider slidably connected to the corresponding one of the rails; and
   a first linkage, one end of the first linkage being pivotally connected to the slider, wherein the first linkage substantially extends away from the base from the slider.

6. The displacement mechanism of claim 1, wherein the arm assemblies are configured to respectively swing in three planes of rotation in the space among the rails, the planes of rotation are parallel to the rails, and any two of the planes of rotation define the same included angle.

7. The displacement mechanism of claim 5, wherein each of the first linkages has a rotation axis perpendicular to the rails.

8. The displacement mechanism of claim 1, wherein each of the parallel linkage assemblies comprises two second linkages, two ends of each of the second linkages are respectively connected to the second end of the corresponding one of the arm assemblies and the moving platform in a multidirectional rotating way, and the second linkages are parallel to each other.

9. The displacement mechanism of claim 8, wherein the ends of each of the second linkages are respectively connected to the corresponding one of the arm assemblies and the moving platform in the form of ball joints.

10. The displacement mechanism of claim 1, wherein the connecting structure is connected to the arm assemblies in the form of ball joints.

11. The displacement mechanism of claim 1, wherein the connecting structure is in the shape of a regular hexagon, and the second ends of the arm assemblies are respectively connected to three nonadjacent vertices of the connecting structure.

* * * * *